Figure 1:
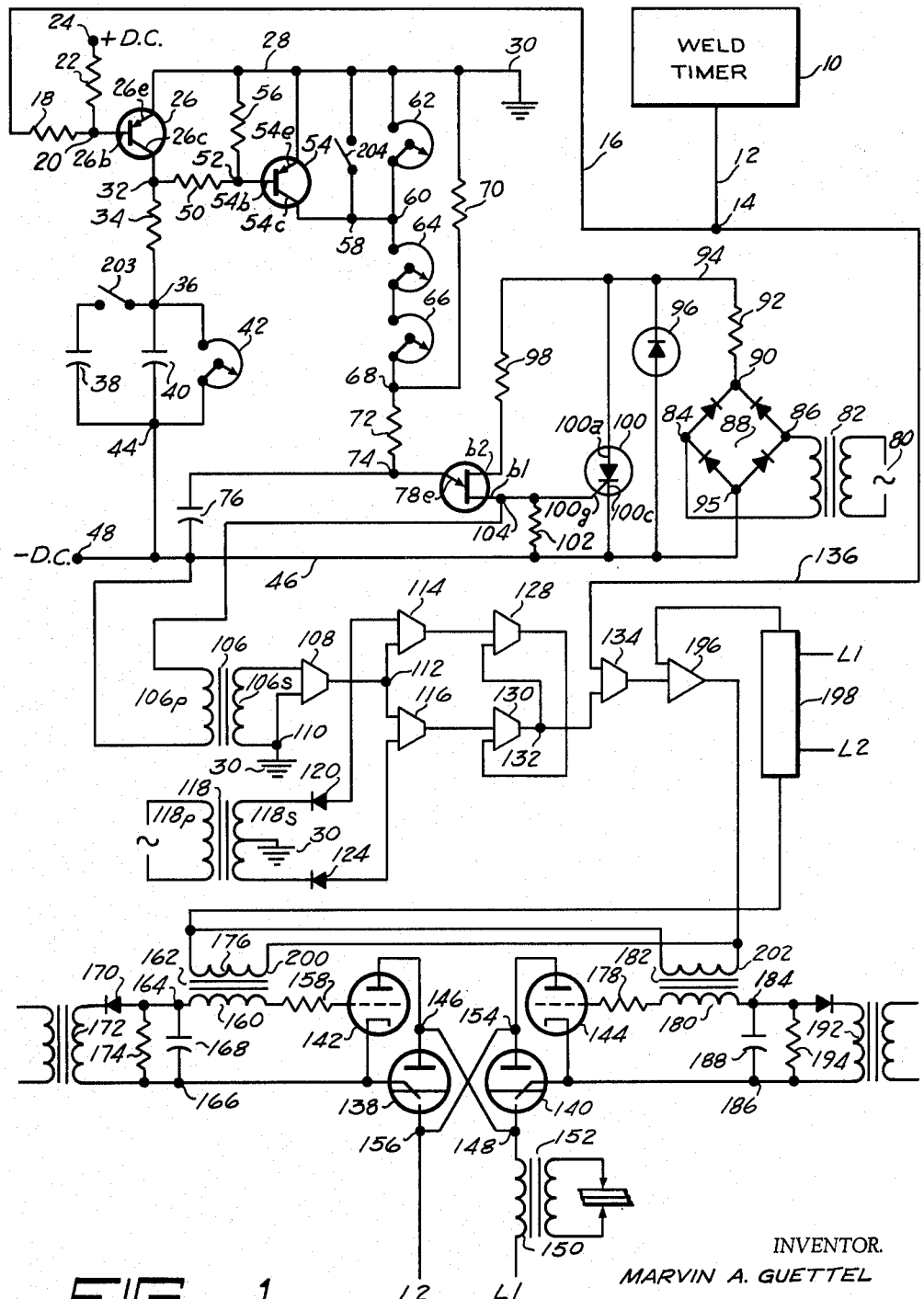

June 28, 1966     M. A. GUETTEL     3,258,697

CONTROL CIRCUIT

Filed Oct. 8, 1962     2 Sheets-Sheet 1

INVENTOR.
MARVIN A. GUETTEL
BY

United States Patent Office 3,258,697
Patented June 28, 1966

3,258,697
CONTROL CIRCUIT
Marvin A. Guettel, Milwaukee, Wis., assignor to Square D Company, Park Ridge, Ill., a corporation of Michigan
Filed Oct. 8, 1962, Ser. No. 228,811
5 Claims. (Cl. 328—63)

The present invention relates to control circuits and more particularly to a circuit which will adjustably control the flow of energy from an alternating current source to a load, such as the electrodes of a resistance welding apparatus.

In resistance welding control, a welding transformer is usually energized by a pair of ignitrons which are connected in inverse parallel between a source of alternating current and a pair of movable welding electrodes. Current flow through the igniters of the ignitrons is controlled by a pair of thyratrons which have their anodes and cathodes connected in circuit with the anodes and igniters of the ignitrons. The thyratrons are grid controlled so their conduction is initiated at adjustable predetermined points on the voltage wave of the source. The foregoing arrangement causes the ignitrons to conduct for selected portions of each half cycle of alternating current of the source and thus provides a means for controlling the magnitude of energy of welding current to the welder electrodes. In present welding controllers this method of stepless variable firing of the ignitrons is called "heat control."

In a static welder control, the thyratrons in the weld firing means circuit may be rendered conductive by a pulse of positive voltage to their respective grids in a manner disclosed in U.S. patent application S.N. 129,828, which was filed on August 9, 1961, by the inventors Charles F. Meyer and James J. Eckl. In the control disclosed in the Meyer application, a NOR circuit element is rapidly switched twice during each full cycle of the alternating current supply by a signal to its input. The output of the NOR is amplified and coupled through a transformer to the grids of the thyratrons so that each time the conductive state of the NOR circuit changes, a positive voltage is impressed on the grid of the thyratron which during the particular half cycle has a positive anode voltage.

While the heat control circuit as disclosed in the Meyer application is economical and provides satisfactory performance when manual heat control is desired, when "Up Slope," "Down Slope" and "Up and Down Slope" function is desired, the analog electrical signals required to cause occurrence of these functions are difficult to incorporate in the circuit.

The circuit according to the present invention includes a novel heat control circuit and up slope circuit which is particularly suited for use with a static weld timer as shown in the Meyer application.

It is an object of the present invention to provide a novel heat control circuit for use in a resistance welder.

It is a further object of the present invention to provide a novel circuit which will adjustably control the instants during each half cycle of alternating current at which the conduction of an electronic switch is initiated.

A further object of the present invention is to provide a novel circuit which will adjustably control the instant during each half cycle of alternating current at which the conduction of an electronic switch is initiated and to provide a means which will vary the adjusted instances at a predetermined rate.

A more specific object of the present invention is to provide the heat control circuit of a resistance welder with means for producing a single polarity signal pulse at a predetermined instant during each half cycle of an alternating current supply and a means for producing a pair of separate signals during the half cycles which are polarized with the alternating current supply and to provide a logic circuit which utilizes the signals as inputs to provide an output which will cause the conduction of a pair of inversely connected ignitrons to be initiated at a selected instant during the half cycles of an alternating current supply.

Another object of the present invention is to provide a resistance welder with a heat control circuit and an up slope circuit which includes means for producing a pulse during each half cycle of an alternating current supply which pulses are of alternate polarity and synchronized with the polarity of the supply and occur at adjustable instants during the half cycle and a means for varying the instants of occurrence of the pulses during the half cycles at a predetermined rate during the initial period of welding current flow.

Further objects and features of the invention will be readily apparent to those skilled in the art from the specification and appended drawing illustrating certain preferred embodiments in which:

FIG. 1 schematically shows the arrangements and components as used in a circuit according to the present invention.

Figure 2:
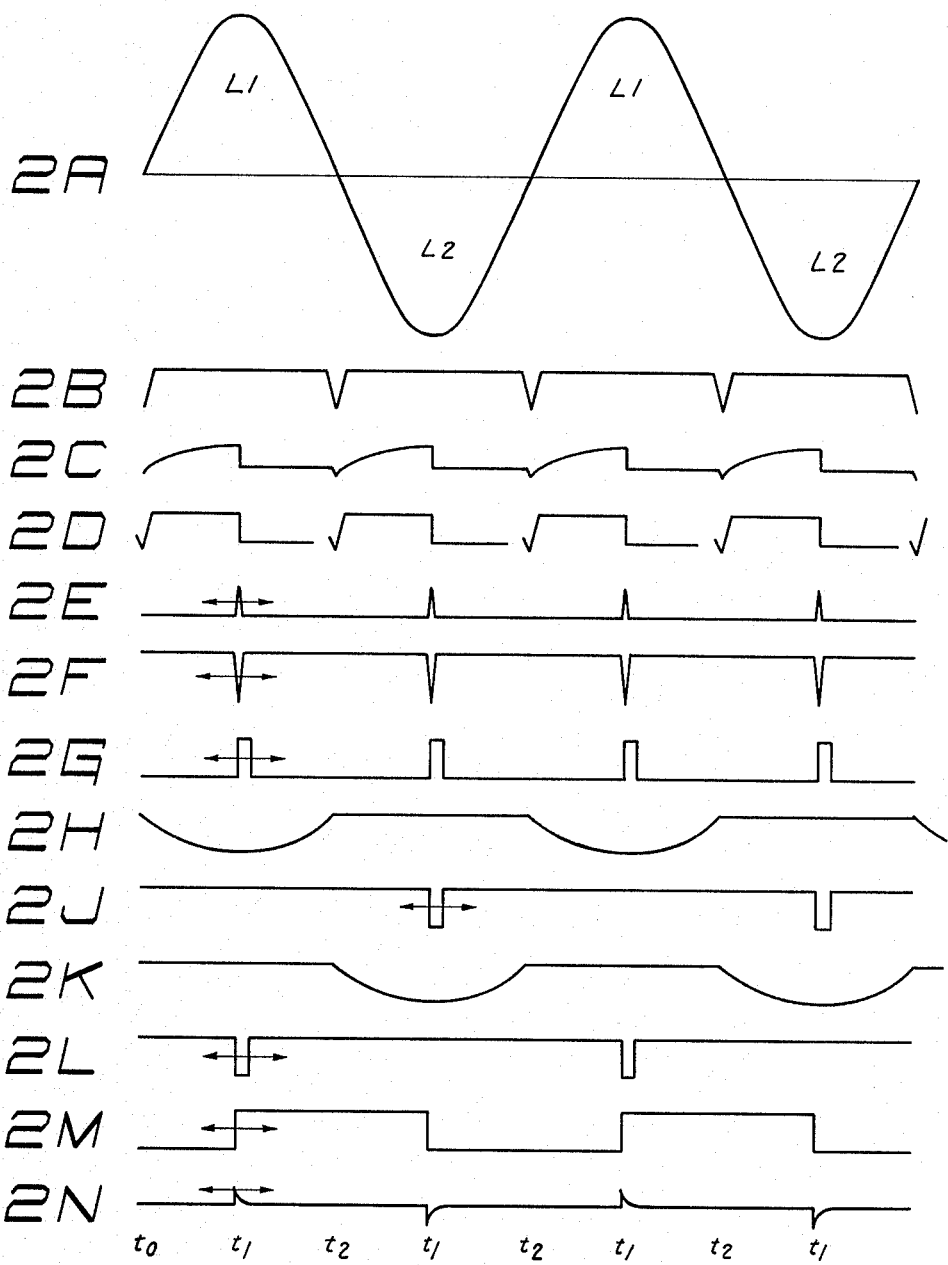

FIG. 2 illustrates the curves and signals with time as a reference as provided by the components in the circuit shown in FIG. 1.

The circuit shown in FIG. 1 includes a weld timer indicated by the numeral 10, which preferably is of the type disclosed in the Meyer application. The weld timer 10 is energized by a suitable source, not shown, and is provided with an output lead 12 which is connected through a junction 14, a lead 16, and a current limiting resistor 18 to a junction 20. The junction 20 is connected through a bias resistor 22 to a positive D.C. voltage source at a terminal 24. The positive voltage source, not shown, preferably provides a voltage of +20 D.C. at terminal 24. The junction 20 is also connected to a base 26b of a transistor 26 which has an emitter electrode 26e and a collector electrode 26c. The emitter electrode 26e is connected to a common lead 28 which is connected to ground indicated by the numeral 30. The collector electrode 26c is connected through a junction 32 and a current limiting resistor 34 to a junction 36. The junction 36 is connected through a three branch parallel circuit consisting of timing capacitors 38 and 40 and a potentiometer resistor 42 to a junction 44 which is in turn connected through a lead 46 to a negative 20 volt D.C. source at terminal 48. The junction 32 is connected through a current limiting resistor 50 and a junction 52 to a base 54b of a transistor 54 which has an emitter electrode 54e and a collector electrode 54c. The junction 52 is also connected through a bias resistor 56 to ground lead 28. Similarly, the emitter 54e is connected to ground lead 28. The collector 54c is connected through a junction 58 to a junction 60. The junction 60 is connected through a potentiometer resistor 62 to ground lead 28 and through series connected potentiometer resistors 64 and 66 to a junction 68. The junction 68 is connected through a calibration resistor 70 to lead 28 and through a calibration resistor 72 to a junction 74. The junction 74 is connected through a timing capacitor 76 to lead 46 and to an emitter 78e of a uni-junction transistor 78 which has a pair of base electrodes indicated by numerals b1 and b2.

An alternating current supply, indicated by the numeral 80, is connected through a suitable transformer 82 to supply the input terminals 84 and 86 of a full wave rectifier 88. A positive output terminal 90 of the rectifier 88 is connected through a voltage dropping resistor 92 to a lead 94. A negative output terminal 95 of the rectifier 88 is directly connected to lead 46. A suitable voltage limiting means, such as zener diode 96 is connected between leads 46 and 94 to limit the voltage therebetween. The lead 94 is connected through a base load resistor 98 to the base $b2$ electrode of the uni-junction transistor 78. A silicon controlled rectifier 100 has an anode 100$a$, a cathode 100$c$ and a gate electrode 100$g$. The anode 100$a$ is directly connected to lead 94 and the cathode is similarly connected to lead 46. The gate 100$g$ is connected to a junction 104, which is connected to the base $b1$ electrode of the uni-junction transistor 78. A resistor 102 for the base $b1$ is connected between junction 104 and lead 46.

A transformer 106 has a primary winding 106$p$ and a secondary winding 106$s$. One of the end terminals of the primary winding 106$p$ is connected to junction 104 and the other is connected to lead 46. The secondary winding 106$s$ has its opposite end terminals connected as a pair of separate inputs to a NOR 108 and with one of the end terminals connected to ground 30. The NOR unit 108 has an output connected through a junction 112 to one of the input terminals of a NOR 114 and a NOR 116.

A transformer 118 has a primary winding 118$p$ and a secondary winding 118$s$. The primary winding 118$p$ is connected to be energized by a suitable source of alternating current. One end output terminal of the secondary winding is connected through a diode 120 to a second input of NOR 114. The other output terminal of secondary winding 118$s$ is connected through a diode 124 to a second input of the NOR 116. The transformer secondary 118$s$ is also provided with a center tap which is connected to ground 30. The NOR 114 has an output terminal connected as an input to a NOR 128 which is connected with a NOR 130 to act as a NOR memory, the output of which is provided by the NOR 130 at a junction 132. The output of NOR 116 is connected as an input to the NOR 130. The signal at junction 132 is connected as an input to a NOR 134 which also receives an input signal from the weld timer at junction 14 through a lead 136.

A typical ignitron type firing panel is shown in the lower portion of FIG. 1. The panel includes a pair of ignitron tubes 138 and 140, each provided with an anode, cathode and igniter electrode and a pair of electronic switches, such as thyratrons 142 and 144, each of which respectively has an anode, cathode and a control grid. The anode of thyratron 142 is connected through a junction 146 and a junction 148 and a primary winding 150 of a welding transformer 152 to a supply lead L1. The cathode of ignitron 140 is connected to junction 148. The anode of thyratron 144 is connected through a junction 154 to a junction 156 which is connected to the cathode of ignitron 138 and to a supply lead L2. The leads L1 and L2 are connected to a suitable source of alternating current. The thyratron tubes 142 and 144 each are provided with a grid bias circuit which normally maintains the thyratrons non-conductive which will now be described. The control grid of the thyratron 142 is connected through a suitable current limiting resistor 158 and a secondary winding 160 of a transformer 162 to a junction 164. The cathode of thyratron 142 is connected through a junction 166 and a capacitor 168 to junction 164. The capacitor 168 is charged with a bias to maintain thyratron 142 non-conducting by a circuit which includes a rectifying diode 170 and a secondary winding 172 of a transformer which has its primary winding connected to the alternating current supply which supplies leads L1 and L2. Connected across the diode 170 and the secondary 172 is a resistor 174 which is in parallel with the capacitor 168 across the supply. The diode 170 is arranged in the circuit so normally the cathode of thyratron tube 142 is positive relative to the grid. Similarly, the control grid of the thyratron 144 is connected through a suitable current limiting resistor 178 and a secondary winding 180 of a transformer 182 to a junction 184. The cathode of thyratron 144 is connected through a junction 186 and a capacitor 188 to junction 184. The capacitor 188 is charged with a bias to maintain thyratron 144 non-conducting by a circuit which includes a rectifying diode 190 and a secondary winding 192 of a transformer which has its primary winding connected to the alternating current supply which supplies leads L1 and L2. Connected across the diode 190 and the secondary 192 is a resistor 194 which is in parallel with the capacitor 168 across the supply. The diode 170 is arranged in the circuit so normally the cathode of thyratron tube 142 is positive relative to the grid.

The control circuit as shown in FIG. 1 also includes a conventional amplifier 196 which is responsive to the output signal from NOR 134. The amplifier is energized from a suitable source of D.C. current 198 which is supplied from the alternating current source through lines L1 and L2. When the amplifier 196 receives a signal change from NOR 134, as will be hereinafter explained, a current change is transmitted to a pair of primary windings 200 and 202 of transformers 162 and 182. The effect of this current change in transformer primary windings will be hereinafter explained.

The circuit shown in the central portion of FIG. 1 includes a plurality of NOR circuit elements which are well known and fully described in the Meyer application supra. If a NOR element receives a signal to any of its inputs, i.e., a negative signal which will hereinafter be designated as a "1," then a signal will be absent at an output of the NOR element. The absence of a signal will be hereinafter referred to as a "0" signal. If none of the inputs of a NOR element receive an input signal, i.e., all of the inputs have a "0" input, then the output signal of the NOR element will be "1."

With the foregoing in mind, the operation of the circuit will be described in connection with the curves shown in FIG. 2. In FIG. 1, a suitable alternating current source, not shown, is arranged to energize the primary windings of transformers 80, 118, 172, 192, lines L1 and L2 and the weld timer with alternating currents which are in phase with one another. The voltage wave of the source is illustrated by the curve 2A in FIG. 2.

The transformer 82 supplies an alternating current voltage to the input terminals 84 and 86 of the rectifier 88. This voltage is rectified and whenever the rectified voltage exceeds the zener level of the zener diode 96, the voltage is clipped. This clipped D.C. voltage, which is shown on curve 2B in FIG. 2, is applied to the anode and cathode of the silicon controlled rectifier 100 and the base 2 and base 1 of the uni-junction transistor 78.

During periods when the voltage as shown on curve 2B is nearly zero, the emitter 78$e$ to $b1$ electrode current path of uni-junction transistor 78 has a very low impedance so as to effectively short the capacitor 76. Thus the capacitor 76 does not charge from the common lead 28 through a circuit which includes the potentiometer resistors 62, 64, 66 and resistor 72 to lead 46. When the voltage at lead 94 reaches the zener level, shortly after voltage zero, as shown on curve 2B, the resistance of the emitter 78$e$ to base $b1$ electrode increases and capacitor 76 begins to charge at a rate determined by the settings of the potentiometer resistors 62, 64 and 66 as shown during the time interval $t_0$–$t_1$, on curve 2C. The instant of time $t_1$ indicated on curve 2C occurs when the firing point of the uni-junction transistor 78 is reached, that is, when the emitter voltage at emitter 78$e$ exceeds the intrinsic stand-off ratio of the transistor 78, as caused by the potential between the leads 94 and 46. At time $t_1$, charge on capacitor 76 is rapidly discharged in a circuit which includes the emitter 78$e$ and the base $b1$ electrode of the uni-junction transistor 78 into a parallel circuit, one branch of which includes the transformer winding 106$p$ and the other branch of which includes the resistor 102 and the gate electrode 100$g$ of the silicon controlled rectifier 100. The anode to cathode voltage of the silicon controlled rectifier is shown on curve 2D. During the time interval $t_0$–$t_1$, the voltage follows the potential between leads 94 and 46. At time $t_1$, the silicon controlled rectifier 100 conducts in response to the conduction of the uni-junction transistor 78. When the silicon controlled rectifier 100 conducts, it effectively shorts out the clipped voltage between leads 94 and 46 for the remainder of the half cycle as shown on the portion $t_1$–$t_2$ of curve 2D. This ensures that the capacitor 76 remains discharged until the start of the next half cycle as indicated by the portion $t_1$–$t_2$ on curve 2C. The silicon controlled rectifier loses control at time $t_2$ when the rectified voltage, as shown on curve 2B drops and approaches zero. When this occurs, the capacitor 76 again begins to charge. The discharge of capacitor 76 through the primary winding 106$p$ is applied to a NOR logic circuit, as will be hereinafter described.

If desired, the circuit may also include a provision for up slope control of the flow of welding current to the welding transformer. It will be seen that the variation in the settings of the potentiometer resistors 62, 64 and 66 will cause a variation in the charging rate of the capacitor 76. The potentiometer 66 is provided to adjust the power factor of the supply in a manner well known to those skilled in the art. The potentiometer 64 is included to vary the heat control function of the welder; that is, it will cause the firing of the ignitrons of the welder to occur at selected points of the voltage wave of the source. The potentiometer 62 and the other circuitry associated therewith is included to provide "slope control" for the welder control. This means is included to automatically vary the instants or points on the voltage wave of the source at which the ignitrons initiate conduction during each half cycle of the voltage wave of the source so that the ignitrons progressively conduct for a greater portion of each half cycle during the beginning of the weld interval. The resistor 62 is progressively shorted out of a predetermined rate by the change in conduction of the transistor 54 in the following manner.

During standby conditions the transistor 26 is rendered conductive by a "1" signal from the weld timer 20, permitting capacitor 40 to be charged through a circuit which includes lead 28, the emitter 26$e$, and collector 26$c$, junction 32, resistor 34, junction 36, capacitor 40, junction 44 and lead 46. Thus during standby the voltage applied to the base-emitter of the transistor 54 is the saturation voltage $V_{ce}$ of transistor 26. The resistors 50 and 56 act as a voltage divider and are selected so that the transistor 54 is rendered non-conductive during this interval.

At the start of the weld period the output signal of lead 16 as provided by the weld timer 20 changes from a "1" to a "0", causing the transistor 26 to be rendered nonconductive. The charge on the capacitor 40 begins to decay through the potentiometer resistor 42 at a rate determined by the setting of the potentiometer resistor 42. As the charge on the capacitor decays, a progressively greater voltage is applied to the base emitter junction of transistor 54, causing the transistor conduction to progressively increase and progressively short the potentiometer resistor 62. At the end of the slope time the transistor 54 is fully conductive and the potentiometer 62 is completely shorted out and the welded current flow will then be determined by the setting of the potentiometer resistors 64. At the end of the weld time the transistor 26 again conducts as the timer supplies a "1" signal to its base and the capacitor 40 is recharged for the next slope time function.

As previously explained, precisely at time $t_1$, the capacitor 76 discharges through the emitter 78$e$ of the unijunction transistor 78 and causes a sharp, narrow pulse of current to be delivered as an input to the primary winding 106$p$ of transformer 106. The occurrence and shape of the pulse is shown on curve 2E. The transformer 106 amplifies this input pulse and the secondary winding 106$s$ provides a sharp output voltage signal pulse during each half cycle of the alternating current supply shown on curve 2F. The output signal pulses at the end terminals of the secondary winding 106 are supplied to a pair of input terminals of the NOR unit 108 which squares and inverts these pulses and provides an input signal to the NOR's 114 and 116 as shown on curve 2G. Simultaneously, the source energizes transformer primary winding 118$p$ which causes a secondary winding to have an output which is supplied as inputs through diodes 120 and 124 to the NOR's 114 and 116 so the NOR's 114 and 116 will individually provide an AND/NOR logic function in response to the output signal from the NOR 108 and the signals which are supplied through the diodes 120 and 124, as is explained as follows.

The secondary winding 118$s$ and diodes 120 and 124 are arranged in the input circuits to NOR's 114 and 116 so the NOR 114 receives a "1" input signal during the half cycle when the alternating current supply has a L1 polarity, as shown on curve 2H, and the NOR 116 receives a "1" input during the succeeding half cycle of L2 polarity of the supply voltage wave, as shown on curve 2K. Simultaneously, during both half cycles of L1 and L2 polarity, NOR 108 supplies an input signal to both NOR's 114 and 116, as shown on curve 2G. The input from NOR 108 appears as a continuing "1" signal which is interrupted once each half cycle and appears as a sharp "0" signal at the precise instant during each half cycle of L1 and L2 polarity when the firing of the ignitrons 138 and 140 is to be initiated.

Thus during each half cycle of L1 polarity the output of NOR 116 pulses from "0" to "1," as shown on curve 2L.

During the succeeding half cycle of the voltage wave of the source, that is, during the periods of L2 polarity, the NOR 116 will receive a "1" signal from transformer 118, as shown on curve 2K, so its output is a continuous "0" during the half cycles of L2 polarity. During periods of L2 polarity the input to NOR 114 from transformer 118 is "0," as shown on curve 2H. However, during periods of L2 polarity, the NOR 108 provides an input to NOR 114 which is shown on curve 2G. Thus at a precise instant during each half cycle of L2 polarity, the output of NOR 114 switches and provides a "1" output signal pulse as shown on curve 2J.

The NOR's 128 and 130 are connected as a NOR memory with the NOR 128 receiving an input from NOR 114 and the NOR 130 receiving an input from NOR 116. The weld timer 10 as set forth in the Meyer application is arranged to provide for lead-trail firing of the ignitrons 144 and 146. That is, the timer 10 will cause the ignitrons 144 and 146 to fire for the same number of half cycles during each welding sequence. Thus at the end and beginning of each welding sequence the memory, consisting of NOR's 128 and 130, will switch to a predetermined state, e.g., NOR 128 will have a "0" output and NOR 130 will have a "1," as shown on curve 2M.

It will be seen from curve 2M that from time $t_0$ to time $t_1$ the output of the NOR memory, i.e., NOR 130, will be "1." At time $t_1$ NOR 130 receives a "1" input signal from NOR 116 and its output switches from "1" to "0." The change in the output signal of NOR 130 is transmitted as a change in inputs to NOR's 134 and 128. The effect of the change in input to NOR 134 will be later discussed. At time $t_1$, on the L1 polarity, the NOR 128 receives a pair of "0" inputs from NOR's 114 and 130, as shown on curves 2J and 2L, so its output switches to "1." This will cause NOR 130 to receive a continuing "1" input during the remainder of the half cycle of L1 polarity and during the portion of the half cycle of L2 polarity preceding $t_1$ of the L2 half cycle. At time $t_1$ of the L2 half cycle NOR 128 receives a momentary "1," which causes the memory to switch and provide a "1" output signal as shown on curve 2M. It will be seen from the foregoing that the output signals from NOR's 114 and 116 causes the NOR memory, consisting of NOR's 128 and 130, to switch so the output of the memory signals appear as shown on curve 2M. The curve 2M shows that at time $t_1$ of the L1 polarity half cycle the output signal of the memory switches from "1" to "0." This "0" signal continues until time $t_1$ of the L2 polarity half cycle when the memory signal output changes from "0" to "1," which is again reversed at time $t_1$ of the L1 polarity half cycle. The foregoing switching of the memory as shown on curve 2M continues through the weld interval which may be determined either over a fixed time interval, as disclosed in the Meyer application, or as in application S.N. 214,937, filed August 6, 1962, wherein a static control for terminating the flow of welding current in response to resistance changes across the parts being welded is disclosed.

The output of the NOR memory consisting of NOR's 128 and 130 is applied as an input to NOR 134. The weld timer 20 supplies an input signal through lead 136 to NOR 134. At the beginning of the weld interval the input signal to NOR 134 from the weld timer 20 changes from a "1" to a "0," so that the switching of NOR 134 is solely under the control of the output signal of the NOR memory which is shown on curve 2M. Thus at a predetermined point during each of the half cycles of L1 and L2 polarity, NOR 134 switches and changes its output signal which would appear as a complement of the curve 2M. The output signal of NOR 134 is amplified by the amplifier 196 which is supplied with direct current from a source 198 that is energized from lines L1 and L2. The output of the amplifier 196 is connected through the primary windings 176 and 202 of transformers 162 and 182. The transformers 162 and 182 are constructed and arranged so the induced voltage in the secondary windings 160 and 180 in response to the current changes in the output of amplifier 196 overcomes the bias provided by capacitor 168 on the grid of thyratron 142 and the capacitor 186 on the grid of thyratron 144 during the half cycles when the anodes of thyratrons 142 and 144 have a positive polarity. This is shown in curve 2N wherein during the L1 polarity half cycle thyratron 142 is rendered conductive and during the time $t_1$ on the L2 half cycle thyratron 144 is rendered conductive to cause corresponding ignition of the ignitrons 138 and 140 respectively.

If desired, a switch 203 may be connected in the circuit with capacitor 38. This switch when closed will cause the rate of change in conduction of transistor 54 to be varied so as to increase the period of slope control. Also a switch 204 may be connected in parallel with potentiometer 62. When switch 204 is closed the slope control portion of the circuit is rendered inoperative.

From the foregoing it is clear that the adjustment of the potentiometer 64 will cause the rate of charging of capacitor 76 to be varied so the point or instant during the half cycle at which the uni-junction transistor 78 switches to its conductive state may be adjusted to occur at any preselected instant during each half cycle of the alternating current supply. This is illustrated by the horizontal arrow on curve 2E. The effect of the variations of conduction of the uni-junction transistor is also shown by horizontal arrows on curves 2F, 2G, 2J, 2L, 2M and 2N. Thus as the instants of switching of the uni-junction transistor 78 is varied, the initiation of conduction of ignitrons 138 and 140 will be varied during each half cycle at which they are conductive so as to provide a precise instant of firing thereof for an improved heat control function of the weld controller. As previously indicated, during the initial portion of the weld interval the point at which the uni-junction is rendered conductive may be varied at a predetermined rate depending upon the rate of discharge of capacitors 40 and/or 38.

Another feature of the circuit is that the conduction of the uni-junction transistor 78 occurs at a predetermined point during each half cycle without reference to the polarity of the source. The circuit which includes the transformer 118, the diodes 120 and 124 and the AND circuit, consisting of NOR's 114 and 116, synchronizes the output of the uni-junction transistor 78 with the line frequency so that the proper pulses of voltage as shown on curves 2J and 2L occur during the proper half cycle to cause proper firing of the ignitrons.

Therefore, while certain preferred embodiments of the invention have been disclosed, it is understood that the invention is not limited thereto, as many variations will be readily apparent to those skilled in the art and the invention is to be given its broadest possible interpretation within the terms of the following claims.

What is claimed is:

1. In a heat control circuit for a resistance welder, the combination comprising: an alternating polarity source, a first signal means including a capacitor and means for initiating an interval during which the capacitor is charged at a predetermined point during each half cycle on an alternating polarity voltage wave of the source and for supplying an output signal pulse in response to a predetermined charge on the capacitor during each of the half cycles, a second signal means responsive to the alternating polarity of the source providing a pair of individual output signals which are synchronized with the alternating polarity of the source, a pair of individual AND logic units each having an output with both of said AND units having an input receiving the output signal pulse from the first signal means and each of said pair of AND units having an input receiving a different one of the pair of output signals from the second signal means and a bistable state switchable logic memory having a single output and a pair of inputs with one of the inputs of the memory receiving an output of one of said pair of AND units for switching the memory to one of its bistable states and the other of said pair of inputs of the memory receiving an output of the other of the said pair of AND units for switching the memory to its other bistable state to provide an output signal at the output of the memory which changes in synchronism with the alternating polarity of the source at an instant during each half cycle determined by the output signal of the first signal means.

2. The combination as recited in claim 1 wherein the AND logic units each include a transistor NOR circuit and the memory includes a pair of transistor NOR circuits.

3. The combination as recited in claim 1 which includes a means in circuit with the capacitor for automatically varying the rate of charging the capacitor during each half cycle.

4. The combination as recited in claim 1 which includes an adjustable means in circuit with the capacitor for varying the rate of charging of the capacitor during each half cycle and means in circuit with the adjustable means for progressively changing the rate of charging of the capacitor during each successive half cycle during which the capacitor is charged.

5. The combination as recited in claim 2 which includes an adjustable means in circuit with the capacitor for preselecting an initial rate of charge for the capacitor during each half cycle and means in shunt circuit with the adjustable means for progressively changing the preselected rate of charge of the capacitor during each successive half cycle during which the capacitor is charged.

References Cited by the Examiner

UNITED STATES PATENTS

| | | | |
|---|---|---|---|
| 2,862,114 | 11/1958 | Solomon | 219—114 X |
| 2,883,583 | 4/1959 | Large et al. | 219—114 X |
| 2,975,338 | 3/1961 | Bivens et al. | 315—84.6 X |
| 2,977,486 | 3/1961 | Dobbie | 307—88.5 |

(Other references on following page)

UNITED STATES PATENTS

| | | | |
|---|---|---|---|
| 3,010,049 | 11/1961 | Riley et al. | 315—252 X |
| 3,041,476 | 6/1962 | Parker | 307—88.5 |
| 3,049,628 | 8/1962 | Kaufman | 307—88.5 |

OTHER REFERENCES

Control Engineering—Static Switching Devices, by Mathias, page 82, May 1956.

"Notes on the Application of the Silicon Control Rectifier," G. E. Semiconductor Products Dept., pages 41 and 42, December 1958, by Gutzwiller.

Dahlin, "Transistor NOR Elements Program Welder," "Control Engineering," vol. 7, pages 111 and 113, February 1960.

ARTHUR GAUSS, *Primary Examiner.*

RICHARD M. WOOD, *Examiner.*

B. P. DAVIS, R. F. STAUBLY, *Assistant Examiners.*